Figure 1:
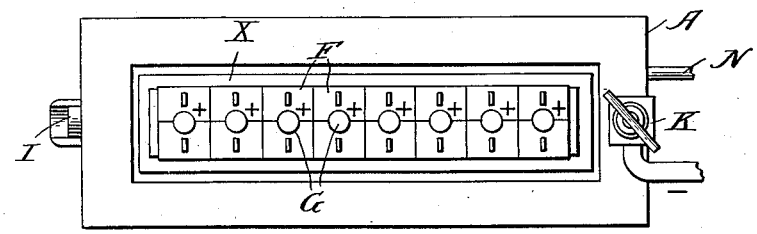

No. 872,985. PATENTED DEC. 3, 1907.
H. S. BLACKMORE.
ART OF PRODUCING ALUMINIUM AND OTHER METALS.
APPLICATION FILED SEPT. 23, 1904.

Witnesses
Edwin L. Bradford
H. N. Jenkins

Inventor
Henry Spencer Blackmore

UNITED STATES PATENT OFFICE.

HENRY SPENCER BLACKMORE, OF MOUNT VERNON, NEW YORK.

ART OF PRODUCING ALUMINIUM AND OTHER METALS.

No. 872,985.　　　　　Specification of Letters Patent.　　　　　Patented Dec. 3, 1907.

Original application filed April 18, 1903, Serial No. 153,329. Divided and this application filed September 23, 1904.
Serial No. 225,642.

*To all whom it may concern:*

Be it known that I, HENRY SPENCER BLACKMORE, a citizen of the United States, residing at Mount Vernon, in the county of Westchester and State of New York, have invented new and useful Improvements in Art of Producing Aluminium and other Metals, of which the following is a specification, the same being a division of my application filed April 18, 1903, Serial No. 153,329.

The object of my invention is to reduce metal from its compounds or compositions by thermo-chemical means and perform electrolysis of compounds in such a manner that a saving of electric current is effected and the electrolysis is facilitated and accomplished economically as compared with methods employed hereto, and consists in employing as electrodes substances containing metal and carbon, either as carbid, acetylid or other union, in which condition either the metal or carbon content, or both, have a natural affinity for the electro-negative constituents of the compound to be electrolyzed, which affinity, when exercised during electrolysis, augments the applied electric current to such a degree that the process may be carried on readily with great saving.

As an illustration of my invention, I will take for example the reduction of aluminium from its oxy-fluorid or mixture of oxid and fluorid. I place a mixture of aluminium oxid and fluorid in a carbon lined reduction pot such as is usually employed for electric smelting and pass a current of electricity therethrough, employing as anode calcium carbid which is readily produced at high temperatures in an electric furnace by previous treatment. As the current of electricity passes through the mixture of aluminium oxid and fluorid it assumes a molten condition which fluidity may be increased by addition of calcium chlorid; when the mass has assumed a fluid condition, electrolysis commences, the electro-negative constituents, fluorin and oxygen being liberated at the anode and aluminium at the cathode which constitutes the interior of the reduction pot or receptacle. The fluorin and oxygen liberated at the anode immediately combine with the calcium carbid, producing carbonic oxid which escapes as a gas, and calcium fluorid, liberating metallic aluminium from the aluminium fluorid and oxid in accordance with the following reaction:

$$Al_2F_6 + 2Al_2O_3 + 3CaC_2 = 6Al + 3CaF_2 + 6CO,$$

as covered by my United States Patent #699,282.

I can substitute other metal carbid or any other practical carbid for the calcium carbid without departing from the spirit of my invention which consists in employing a metal carbid or its equivalent as electrode in the reduction of metals from their compounds.

The anode may consist of a mixture of calcium or other carbid with carbon or other binder, or may consist wholly of the carbid, the essential feature being that the electrode contains a carbid of some form. Instead of metal oxy-fluorid or its equivalent, I can employ any other oxy-haloid or any substance containing metal and two or more electro-negative elements, or a metal oxid *per se*, so long as the electro-negative elements are capable of combining with the elements of the carbid electrode.

Figure 2:
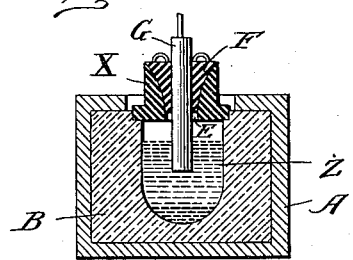
Figure 3:
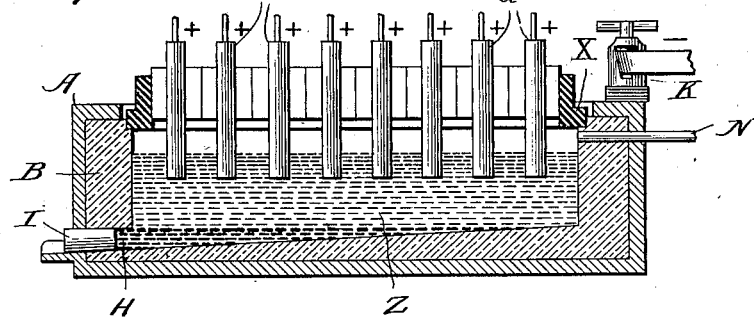

The apparatus which I prefer to employ in carrying out my process for reducing metals, is illustrated in the accompanying drawing, in which, Figure 1 is a plan or top view; Fig. 2 is a transverse vertical section; and Fig. 3 is a longitudinal vertical section.

Referring to the drawing, the letter A designates a box or receptacle preferably of cast-iron, lined with a conductive substance B, such as carbon. The material to be reduced is introduced into the apparatus through the openings E which are closed by the insulating covers or plugs F passing into the insulating cover X through which passes the electrode G which consists of or contains a carbid and is adapted to be employed as anode during the process of electro-chemical reduction.

In the operation of the process I place in the receptacle Z a quantity of aluminium oxid and aluminium fluorid and fuse the same by passing a current of electricity therethrough between the carbon lining of the receptacle B and the electrode G, having first started an electric arc between the same by placing them in contact and gradually separating them, and feed the aluminium oxid and aluminium fluorid in at intervals as it fuses and continue to add the mixture until the interior of the apparatus has been sufficiently filled; I then add to the molten content a small quantity of calcium chlorid to assist the fluidity of the mixture and on continuing the current a reducing action is set up between the carbid contained in the electrode G, such as calcium carbid, and the electro-negative constituents fluorin and oxygen of the aluminium fluorid and oxid supplied thereto are removed, the fluorin combining with the calcium of the calcium carbid and the oxygen with the carbon thereof, at the same time separating metallic aluminium which accumulates in the bottom of the apparatus and is withdrawn from time to time through the tap-hole H by removing the tap-hole plug I. The carbon oxid evolved during the reduction by combination of the carbon of the anode G with oxygen of the substance reduced, escapes as gas through the conduit N.

By supplying new anodes G and fresh aluminium oxid and fluorid from time to time, withdrawing the metal reduced and the accumulating fluorids, the process may be carried on continuously so long as the materials are maintained in a molten condition.

The term "carbid", as employed throughout this specification and claims, has particular reference to unions of metal with carbon of any atomicity, be it a normal carbid, or acetylid, so long as the carbon compound exists in a form capable of being utilized in accordance with the process as herein set forth.

I am aware that electrodes of calcium carbid have been employed in aqueous solutions during the process of electrolysis for the purpose of producing hydrogen carbid (acetylene) and additive and substitution products thereof by secondary reaction of the anion and cathion thereon. The process involved in this operation, however, is not one for yielding metal as hereinbefore set forth, for the reason that a carbid is yielded by the decomposition of the compound by action of the calcium carbid and that this carbid is transformed into other compounds by the action of the electro-positive element, namely hydrogen, transiently evolved during electrolysis. In other words there is no yield of hydrogen during electrolysis as the same is taken up in its nascent form and transformed by the action of the hydrogen carbid (acetylene), produced, together with the surrounding fluids.

It will be noted that my process consists in yielding metal from compounds containing the same by the action of a metal carbid capable of abstracting the electro-negative constituents therefrom, and an electric current, which electric current has the property of bringing the ingredients to a condition capable of reaction.

Having now described my invention, what I claim as new and desire to secure by Letters Patent is:—

1. The process of producing metal which consists in exposing a substance containing the metal to electrolysis, while employing an electrode containing a carbid of a different metal decomposable by an ingredient of the substance employed and capable of liberating metal therefrom.

2. The process of producing metal which consists in exposing a compound containing the metal to electrolysis, while employing an electrode containing a more electro-positive metal carbid decomposable by an ingredient of the substance employed and capable of liberating metal therefrom.

3. The process of producing metal which consists in exposing a substance containing metal and two or more non-metallic elements to electrolysis, while employing an electrode containing a carbid of a different metal decomposable thereby and capable of liberating metal therefrom.

4. The process of producing metal, which consists in exposing a substance containing metal, oxygen, and a haloid, to electrolysis, while employing an electrode containing a carbid of a different metal decomposable thereby and capable of liberating metal therefrom.

5. The process of producing metal, which consists in exposing a substance containing a metal and oxygen to electrolysis, while employing an electrode containing a carbid of a different metal decomposable thereby and capable of liberating metal therefrom.

6. The process of producing metal which consists in exposing a compound containing metal and one or more electro-negative elements capable of reacting with a carbid to yield metal to electrolysis, while employing an anode containing a carbid of a metal more electro-positive than the metal of the substance to be reduced.

7. The process of producing metal, which consists in fusing a compound containing a metal and one or more electro-negative elements, and exposing it to the action of a carbid of a different metal capable of liberating metal therefrom and an electric current.

8. The process of producing metals, which consists in fusing a compound containing a metal and one or more electro-negative elements, and exposing it to the combined action of a carbid of a different metal capable of liberating metal therefrom, and an electric current.

9. The process of producing metal which consists in passing an electric current through a mass containing a metal and one or more electro-negative elements, together with a carbid of an element more electropositive than the metal desired said carbid being capable of liberating metal therefrom.

10. The process of producing metal, which consists in exposing a compound of metal with one or more electro-negative elements, while in contact with a carbid of a different metal decomposable thereby and capable of liberating metal therefrom, to the action of an electric current.

11. The process of producing aluminium, which consists in exposing a substance containing the same to the combined action of an electrode of a carbid of a different metal capable of liberating metal therefrom and an electric current.

12. The process of producing aluminium which consists in exposing a substance containing the same capable of yielding aluminium by action of a carbid to the combined action of an electrode of calcium carbid and an electric current.

13. The process of producing aluminium, which consists in exposing a substance containing aluminium, oxygen, and a haloid, to electrolysis, while employing an electrode containing a carbid of a different metal decomposable thereby.

14. The process of producing aluminium which consists in exposing a substance containing aluminium, fluorin, and oxygen, to the action of an electrode of calcium carbid and an electric current.

In testimony whereof I have signed my name to this specification in the presence of two subscribing witnesses.

HENRY SPENCER BLACKMORE.

Witnesses:
J. R. NOTTINGHAM,
C. C. WRIGHT.